Jan. 12, 1943.　　　D. L. BABCOCK ET AL　　　2,307,981
SETTING-UP SLIDE FOR STEREO PROJECTORS
Filed Aug. 3, 1940
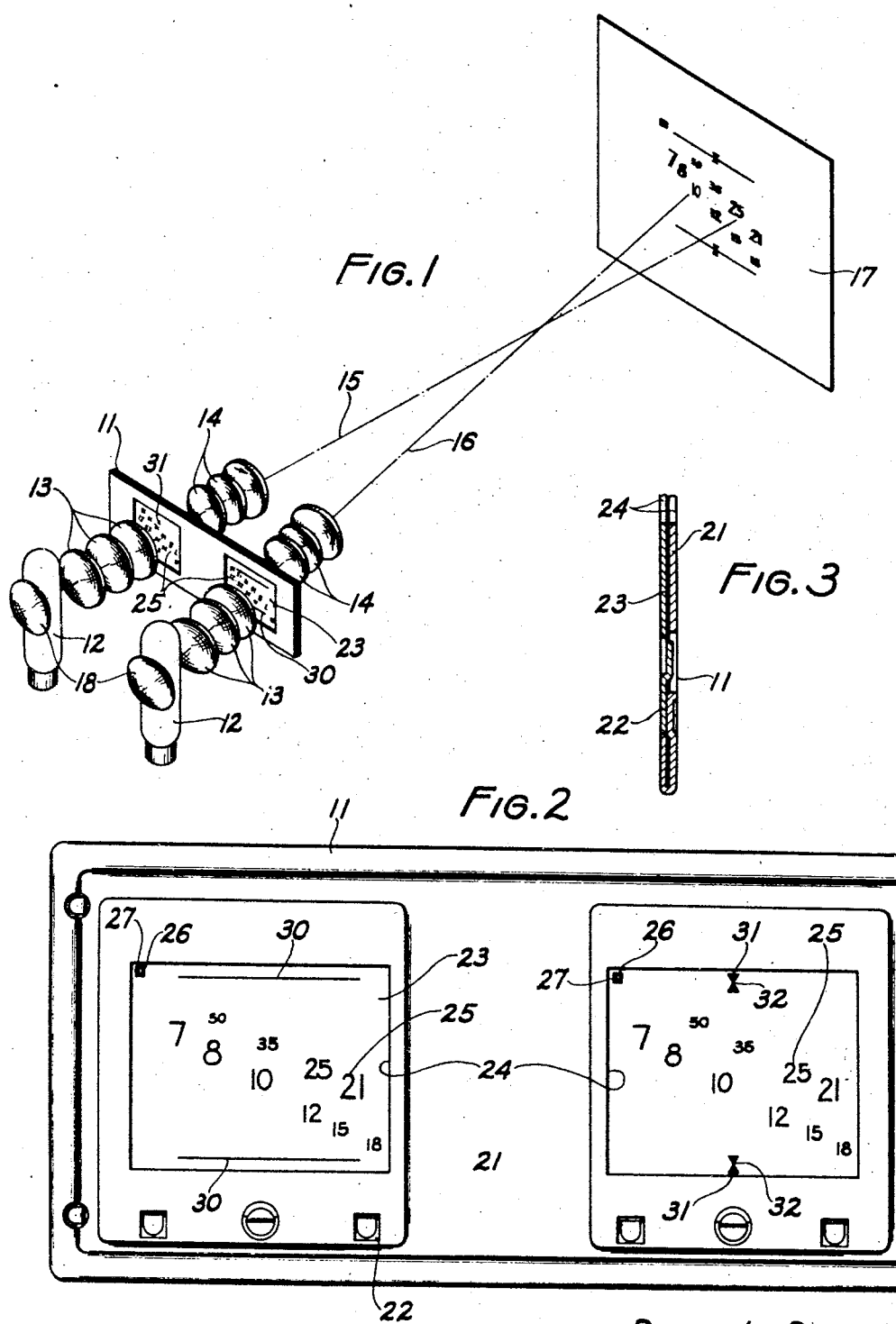
DAVID L. BABCOCK
JOSEPH L. BOON
INVENTORS
BY
ATTORNEYS Patented Jan. 12, 1943

2,307,981

UNITED STATES PATENT OFFICE 2,307,981

SETTING-UP SLIDE FOR STEREO PROJECTORS

David L. Babcock and Joseph L. Boon, Rochester, N. Y., assignors to Eastman Kodak Company, Rochester, N. Y., a corporation of New Jersey Application August 3, 1940, Serial No. 350,699

6 Claims. (Cl. 88—29)

The present invention relates to stereo projectors, and more particularly to a setting-up slide for such projectors.

One object of the invention is the provision of a slide of this class which is formed with means by which the position of the two light beams of the projector may be properly adjusted on an image receiving screen for stereo viewing.

Another object of the invention is the provision on a slide of the class described of separate adjusting indicating means or marks by which both the vertical and lateral positions of the beams may be properly arranged for stereo viewing on an image receiving screen.

A further object of the invention is the provision of a setting up slide of this kind which is extremely simple in construction, inexpensive to manufacture, and highly effective in use.

To these and other ends, the invention resides in certain improvements and combinations of parts all as will be hereinafter more fully described, the novel features being pointed out in the claims at the end of the specification.

In the drawing:

Fig. 1 is a schematic view of a stereo projector and image receiving screen, showing the relation thereto of a setting-up slide constructed in accordance with the preferred embodiment of the present invention;

Fig. 2 is a view of the setting up slide detached from the projector, and on a larger scale than that shown in Fig. 1, showing the relation of the various adjustment indicating scales or marks on the slide; and Fig. 3 is a transverse sectional view through the slide indicated in Fig. 2, showing the arrangement of the various parts comprising in the slide.

Similar reference numerals throughout the various views indicate the same parts.

The drawing shows a stereo projector of the type in which the light beams cross over between the projector and the viewing screen, as shown in Fig. 1. Very often stereo image areas or transparencies are mounted in a slide for use in a hand viewer. The two image areas or transparencies are mounted in such slides so that when placed in the viewer, the right hand image area will be in alignment with the right eye of the user while the left hand image area will be in alignment with the left eye. When, however, such a slide is to be used in a projector, it is necessary to insert the slide in the projector so as to reverse the position of the image areas. In other words, the right image area is now on the left while the left image area is now at the right. The two image areas are also inverted. This reversed and inverted arrangement of the image areas is shown in Fig. 1 in connection with the setting-up slide to be later more fully described.

In such a projector, the right-hand lens is used to project the image area or picture seen by the left eye, and the left hand lens is used to project the image area or picture to be seen by the right eye. Since points intended to be seen at infinity should be separated by the inter-ocular distance of the observer, and since the point to be seen by the left eye should be the left point and the point to be seen by the right eye should be the right point, it is necessary to adjust the optical members of the projector so that the two light beams cross between the projector and the screen in order to give the required location of the two points to make the image appear at infinity. Since the separation of the points on the screen must be constant regardless of the projection distance, it is necessary to provide adjustment of the lenses to vary the amount of convergence of the light beams in accordance with the screen distance.

The setting-up slide of the present invention is adapted to help the projectionist to adjust the lenses properly. This setting up slide is generally indicated by the numeral 11 and is adapted to be used in connection with a stereo projector shown schematically in Fig. 1, and comprising a pair of projection lamps 12 arranged in side-by-side relation, and condensing lenses 13 and objective lenses 14 positioned on the optical axis of the lamps 12. Suitable reflectors 18 are positioned behind each of the lamps, as is well known practice. The lenses 13 and 14 are adapted to project a pair of light beams 15 and 16 onto a suitable image receiving or viewing screen 17 spaced from the projector and arranged in the path of the light beams, the latter crossing over between the projector and the screen so that the images will be in proper relation on the screen, all of which is clearly illustrated in Fig. 1.

In order to secure the desired stereo effect, it is essential that the position of the two light beams on the screen be adjusted in accordance with the distance between the projector and the screen. Each variation necessitates a different variation in the convergence of the light beams so as to properly maintain the latter in adjustment for stereo viewing. There is, therefore, a definite relation between the light beam convergence and the projector to screen distance. To facilitate the ready and easy adjustment of these light beams, the present invention provides the setting-up slide 11 which is arranged in the projector between the condenser lenses 13 and the objective lenses 14 in the position to be occupied by the image carrying stereo slides to be used in the projector, as illustrated in Fig. 1.

This setting-up slide is of the same dimensions as the stereo slides which are to be viewed, and is formed of a pair of flat plate-like members 21 and 22 of any suitable material, preferably thin sheet metal, between which a strip of transparent sheet material 23 is arranged. These plates are also formed with a pair of registering viewing openings or apertures 24 which are in alignment with a pair of adjustment indicating scales or designations 25 formed on the transparent sheet 23, as clearly shown in Fig. 2. These scales or designations comprise pairs of numerals which represent the various projector to screen distances, and are arranged in the manner clearly shown in Fig. 2. When this slide is placed in the projector, it is arranged in the position shown in Fig. 1 in which the right-hand scale of Fig. 2 is at the left, and the left-hand scale is at the right, the scales also being inverted. The scales are positioned in the path of the two light beams 15 and 16 so that the latter will project the images from the numerals onto the screen 17, as shown in Fig. 1.

The various pairs of corresponding numerals of the scales 25 are so arranged on the slide that when the correct pair of numerals corresponding to the projector to screen distance are brought into superimposed or registering relation on the screen, the light beams 15 and 16 will be in proper lateral adjustment on the screen for stereo viewing. For example, if the screen is spaced ten feet from the projector, the convergence of the light beams 15 and 16 is adjusted to bring the two numerals 10 of the scales 25 into superimposed or registering relation on the screen 17, as shown in Fig. 1. When the two numerals 10 are thus positioned, the light beams 15 and 16 are in proper adjustment for a projector to screen distance of 10 feet. With such an adjustment, all the other numerals of the scales are out of registry, as shown in Fig. 1. Thus for each projector to screen distance, the proper set of numerals, corresponding to the distance then being used, are brought into superimposed or registering relation to properly adjust the light beams for stereo viewing. Such variations or adjustments of the light beams may be secured by moving one of the objective lenses 14, in any suitable and well-known manner. As such adjustment means does not constitute a part of the present invention, and is not necessary for a complete understanding thereof, the showing of such adjusting means is not deemed essential.

The above scales thus afford a means by which the projectionist may readily and easily adjust the light beams in accordance with the projector to screen distance then being used. In some cases, however, it may be inconvenient to measure such distance, or the measuring means may not be readily available so that the proper projector to screen distance cannot be definitely determined. To meet this condition, the present invention also provides an arrangement by which light beams may be accurately adjusted without knowing the distance between the projector to the screen. Obviously, in such cases the scales 25 are no longer suitable as their use depends on the projector to screen distance being known.

As pointed out above, points intended to be seen at infinity should be separated on the screen 17 the interocular distance of the observer. This distance is approximately 2½ inches. Thus if the infinity points are spaced this distance on the screen 17, the light beams will be properly adjusted for stereo viewing irrespective of the distance between the projector and screen. To secure this result, the transparent sheet 23 has suitably formed thereon a pair of horizontally aligned opaque marks of indication 26, see Fig. 2, formed with central transparent areas 27, which are spaced on the sheet to correspond to the spacing of an infinity point in a pair of normal stereo images. These marks 26 and areas 27 are positioned in the path of the two light beams 15 and 16 so that the latter may project the images of these marks onto the screen 17, as shown in Fig. 1. Now if the convergence of the light beams 15 and 16 is adjusted so that the transparent areas 27 of the marks 26 are separated on a screen 17 a distance of approximately 2½ inches, the average interocular distance, the light beams will be in proper adjustment for stereo viewing. By means of this arrangement proper adjustment of the light beams may be secured without necessitating a knowledge of the distance between the screen and the projector.

While the above arrangement provides for the correct lateral adjustment of the two light beams, it is apparent that the two beams should also be in vertical alignment to secure the desired stereo effect, as is apparent. To secure such vertical adjustment, the sheet 23 is also formed with a thin elongated opaque reference mark or line 30 which is positioned adjacent and slightly above one of the scales 25, and is arranged to be inserted in the path of only one of the light beams, such as the beam 16, so that the latter will project the image of the line onto the screen 17, as shown in Fig. 1. The sheet 23 is also formed with a second opaque reference mark 31 of the shape best shown in Fig. 2, and positioned adjacent the other scale 25. The second mark 31 is arranged in the path of the other light beam, the beam 15, so that the latter will project the image of the second mark into the screen 17. The mark 31 is formed with a portion or section 32 of reduced area arranged in horizontal alignment with the line or mark 30. It is now apparent that if the images of the line 30 and the reduced portion 32 are in registry or horizontal alignment on the screen 17, as shown in Fig. 1, the two light beams are in proper vertical adjustment. If, however, the line 30 does not register with the portion 32 of the mark 31, the light beams must be vertically adjusted to bring these portions into proper registry, as shown in Fig. 1.

The above-described setting-up slide thus provides a means by which both lateral and vertical positioning of the light beams may be adjusted for stereo viewing. These various scales and marks thus afford an adjustment indicating means by which the projectionist may readily and easily secure the correct beam convergence in accordance with the projector to screen distance. After the proper adjustments of the light beams have been made, the setting-up slide 11 is removed from the projector, and may be replaced by slides containing stereo image areas which are then projected onto the viewing screen by the light beams 15 and 16 so as to secure the desired stereo viewing.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. A setting up slide device formed of a pair of sheet like members supporting therebetween a strip of transparent sheet material, said sheet members being formed with pairs of aligned viewing openings for positioning in the separate beams of a stereo projector, pairs of similar adjustment indicating scales on said transparent sheet in said viewing openings, said scales having a plurality of pairs of numerals representing various projector to screen distances and positioned in said viewing openings on said slide to be projected in superimposed relation on said screen, the numerals of the two scales corresponding to the projector to screen distance then being used to indicate when the projecting-light beams are properly positioned relative to the screen for stereo viewing.

2. A setting up slide device formed of a pair of sheet like members supporting therebetween a strip of transparent sheet material, said sheet members being formed with pairs of aligned viewing openings for positioning in the separate beams of a stereo projector, an adjustment area on said transparent sheet in each of said viewing openings and positioned therein to be separately projected by the beams onto a viewing screen in a predetermined spaced horizontal relation thereon to indicate when the projecting light beams are properly adjusted laterally relative to the screen for stereo viewing.

3. A setting up slide device formed of a sheet like member supporting therebetween a strip of transparent sheet material, said sheet members being formed with pairs of aligned viewing openings for positioning in the separate beams of a stereo projector, pairs of similar adjustment indicating scales on said transparent sheet in said viewing openings, said scales having a plurality of pairs of numerals representing various projector to screen distances and positioned in said viewing openings on said slide to be projected in superimposed relation on said screen, the numerals of the two scales corresponding to the projector to screen distance then being used to indicate when the projecting-light beams are properly positioned laterally relative to the screen for stereo viewing, and pairs of adjustment indicating reference marks on said slide and positioned in said viewing openings for projection by the projection beams in horizontal alignment to indicate when the projecting light beams are properly positioned vertically relative to the screen for stereo viewing.

4. A setting up slide device formed of a pair of sheet like members supporting therebetween a strip of transparent sheet material, said sheet members being formed with pairs of aligned viewing openings for positioning in the separate beams of a stereo projector, an adjustment area on said transparent sheet in each of said viewing openings and positioned therein to be separately projected by the beams onto a viewing screen in a predetermined spaced horizontal relation thereon to indicate when the projecting light beams are properly adjusted laterally relative to the screen for stereo viewing, and pairs of adjustment indicating reference marks on said slide and positioned in said viewing openings for projection by the projection beams in horizontal alignment to indicate when the projecting light beams are properly positioned vertically relative to the screen for stereo viewing.

5. A setting up slide device comprising a strip of transparent sheet material having portions thereof for positioning in the separate beams of a stereo projector, a pair of similar adjustment indicating indicia on said sheet and in the path of said beams to be projected thereby onto a viewing screen and when arranged in a predetermined relation on said screen to indicate that the projecting-light beams are properly adjusted laterally relative to the screen for stereo viewing.

6. A setting up slide device comprising a strip of transparent sheet material having portions thereof for positioning in the separate beams of a stereo projector, a pair of similar adjustment indicating indicia on said sheet and in the path of said beams to be projected thereby onto a viewing screen and when arranged in a predetermined relation on said screen to indicate that the projecting-light beams are properly adjusted laterally relative to the screen for stereo viewing, and pairs of vertical adjusting indicating reference marks on said slide and positioned in the path of said beams to be projected thereby onto said screen and when arranged in horizontal alignment to indicate that the beams are properly adjusted vertically relative to said screen for stereo viewing.

DAVID L. BABCOCK.
JOSEPH L. BOON.